Nov. 7, 1967  C. L. MOULTON  3,350,966
AUTOMATIC DIGITAL TOOL-SETTING SYSTEM
Filed June 2, 1966  3 Sheets-Sheet 1

INVENTOR.
Charles L. Moulton
BY
ATTORNEY.

INVENTOR.
Charles L. Moulton
BY
ATTORNEY.

Nov. 7, 1967  C. L. MOULTON  3,350,966
AUTOMATIC DIGITAL TOOL-SETTING SYSTEM
Filed June 2, 1966  3 Sheets-Sheet 3
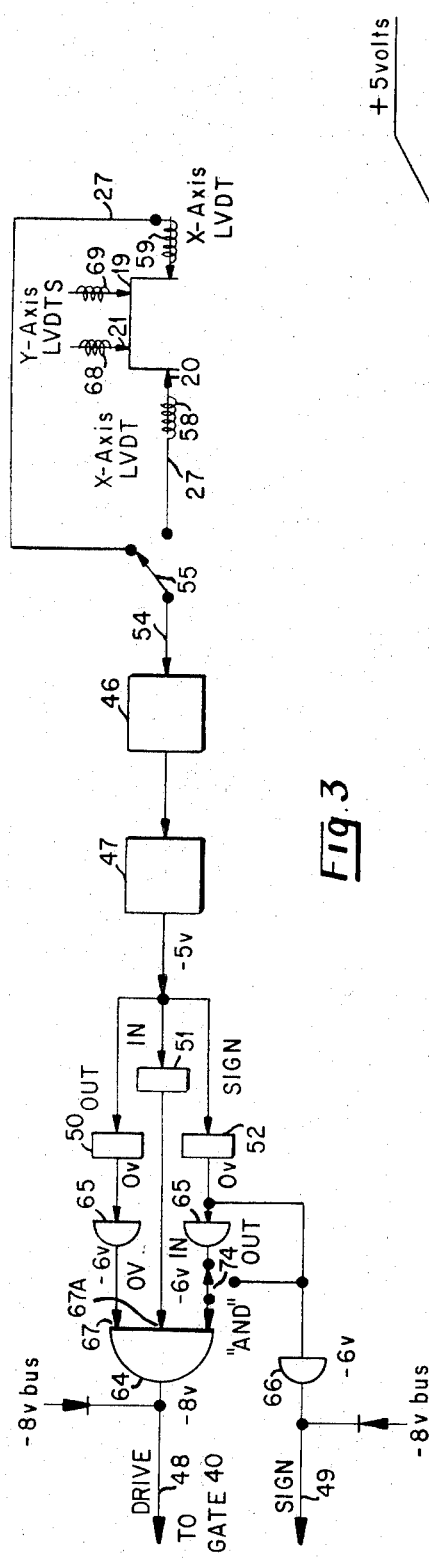
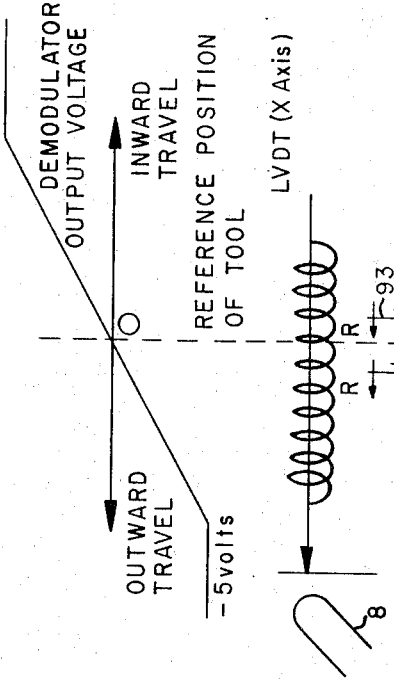
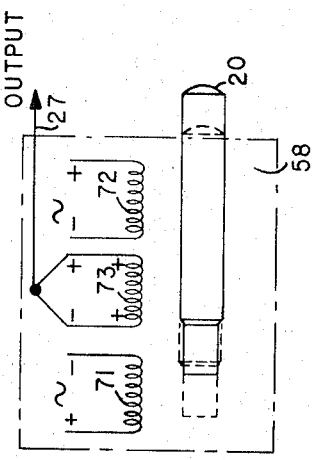
INVENTOR.
Charles L. Moulton
BY
*Roland A. Anderson*
ATTORNEY.

United States Patent Office 3,350,966
Patented Nov. 7, 1967

3,350,966
AUTOMATIC DIGITAL TOOL-SETTING SYSTEM
Charles L. Moulton, Knoxville, Tenn., assignor to the United States of America as represented by the United States Atomic Energy Commission
Filed June 2, 1966, Ser. No. 554,911
5 Claims. (Cl. 82—21)

The invention described herein was made in the course of, or under, a contract with the U.S. Atomic Energy Commission.

This invention relates to precision lathes and more particularly to a control system for the automatic control of a precision lathe including means for automatically positioning the cutting edge of the tool to a preselected reference position prior to a machining operation.

Tape-controlled lathes or the like, in general, operate from commands punched into a tape, fed to the control system of the machine, and converted to commands to the lathe. In order for any plan of movement of the cutting tool of the lathe to possess any meaning, there has to be a reference point established, to which all ordered movements of the machine will be related. The normal practice is to establish some fixed reference point on, attached to, or in the proximity of the machine, to which point the cutting tool may be adjusted, thereby starting any operation of the machine with the cutting tool at a known point. The tape, from which the machine movements are to be controlled, is then coded with a large number of X or Y coordinates referenced to the known point. Various schemes are available for selecting the X and Y coordinates which will be required to cause the machine tool to trace a desired path in its cutting operation. The programmed path in all known tape-controlled lathes is chosen to be that path followed by the center of a cutting tool ground to a radius at its cutting tip.

The above reference point may be associated with the center of the tool turret, for example, and this part of the machine will return to the reference point upon the machine executing the command of "Return to Reference." By knowing this fact, the machinist may, by much time-consuming manipulation, adjust the tool a given distance from the center of the turret and thereby know within a small degree of certainty that his tool is located a set distance from the reference point established at the center of the turret. The tape-controlled movements of the tool may then be programmed, taking into consideration the fact that the tool is actually displaced from reference by a given amount. Periodic tool wear and tool replacement necessitates the manual readjustment of the tool to the same given distance, mentioned above, from the center of the turret such that a plurality of products can be sequentially and respectively machined to substantially the same dimensions. Obviously this is an undesirable arrangement for a machine whose very design is directed toward shortening machining time for producing a plurality of a given product each having substantially the same machined dimensions.

Thus there exists a need for a tape-controlled machine wherein the time required to position the tool of the machine with respect to a reference position is minimized such that a plurality of a given product can be produced with the machine with a substantial reduction in the overall operating time.

Therefore, it is the object of the present invention to provide a means associated with a tape-controlled machine for automatically positioning the tool of the tape-controlled machine to a predetermined reference position prior to a machining operation on a part, and to repeat such tool positioning as often as needed or required such that a plurality of parts may be respectively machined to the same close tolerances to produce a plurality of parts with substantially the same machined dimensions.

This and other objects and advantages of the present invention will become apparent upon a consideration of the following detailed description and the accompanying drawings, wherein:

FIG. 3 is a more detailed showing of the tool-positioning circuitry of FIG. 2;

FIG. 4 is a schematic showing of the operational sequence of the gauging circuit of FIG. 3; and FIG. 5 is a schematic showing of one of the Linear Variable Differential Transformer (LVDT) gauging units of FIG. 3.

The above object has been accomplished in the present invention by providing means to sense the position of the cutting edge of the machine tool and then activate the X and/or Y slides of the machine to reposition the tool cutting edge until it is precisely in register with a preselected reference position. Both systems then disable themselves, restoring control to the program tape or to the machine operator. This is accomplished by causing the tool to engage respective position-sensing gauges mounted in the path of the cutting tool in the X and Y directions and to utilize the signals from the respective gauges to actuate the X and Y slides of the machine until the output signals from the gauges are zero or near zero, at which point the cutting edge of the tool is in the desired reference position and control is restored to the program tape, or, if desired, to the machine operator. Thus, in the present invention the machine tool itself can be positioned automatically to the same reference position when necessary or as often as desired, instead of manually positioning the tool a given distance from a reference point on the machine each time such positioning is necessary or desired as is the common practice with prior machines.

In the present invention, the automatic positioning of the tool itself to a preselected reference position and programming the tape with respect to such a reference position to effect the desired machining operation on the part to be machined, and the use of the present gauging system to reposition the cutting tool to the reference position as often as necessary or desired in a minimum of time provide a system for the sequential machining of a plurality of parts having substantially identical dimensions and close tolerances with a substantial saving in overall operating time.

Figure 1:
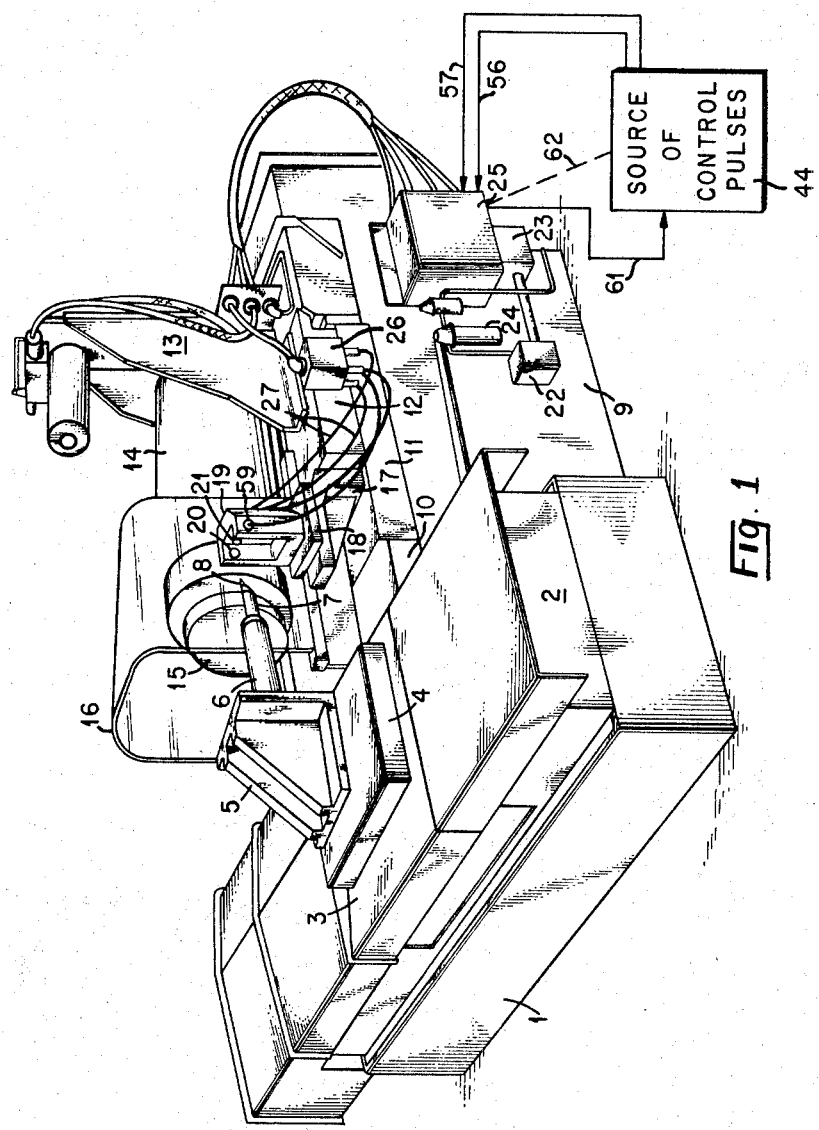
FIG. 1 is an isometric view of a typical tape-controlled lathe including the tool-setting gauge of the present invention.

With reference to the drawings, FIG. 1 shows a typical tape-controlled lathe which is provided with the tool position gauging means of the present invention for positioning the tool to a preselected reference position. In FIG. 1, the members 1 and 9 form a T-shaped base member for supporting the lathe components. Mounted on top of member 1 is support member 2 upon which a slide member 3 is adapted to slide in a longitudinal direction. A base member 4, affixed to member 3, supports a bracket member 5. Member 5 in turn supports a chuck member 6 which holds a tool holder 7 for holding a cutting tool 8.

Base member 9 has mounted on the top thereof a support member 10 upon which a slide member 11 is adapted to slide in a direction perpendicular to the slide direction of member 3. Mounted on top of slide member 11 is a base member 12 for supporting a bracket member 13. Member 13 supports a spindle 15, and control means, not shown, are mounted within a housing 14 for imparting the desired rotary movement to the spindle 15 in a conventional manner. An open-ended protective hood 16 encloses the spindle 15.

The movement of slide member 3 and the components affixed thereto, in one direction or in the opposite direction, as may be required, is designated as the X motion of the machine, and the movement of slide member 11 and the components affixed thereto in respective opposite directions and perpendicular to the above X motion is designated as the Y motion of the machine. The respective X and Y motions of the machine are controlled by electro-hydraulic control means by control signals from a programmed tape in a conventional manner. Part of the control means includes members 22, 23, 24, and 25. A typical control unit which may be used with the conventional lathe, described above, may be a standard Heald-Bendix "Dynapath-20" machine control unit, for example.

Figure 2:
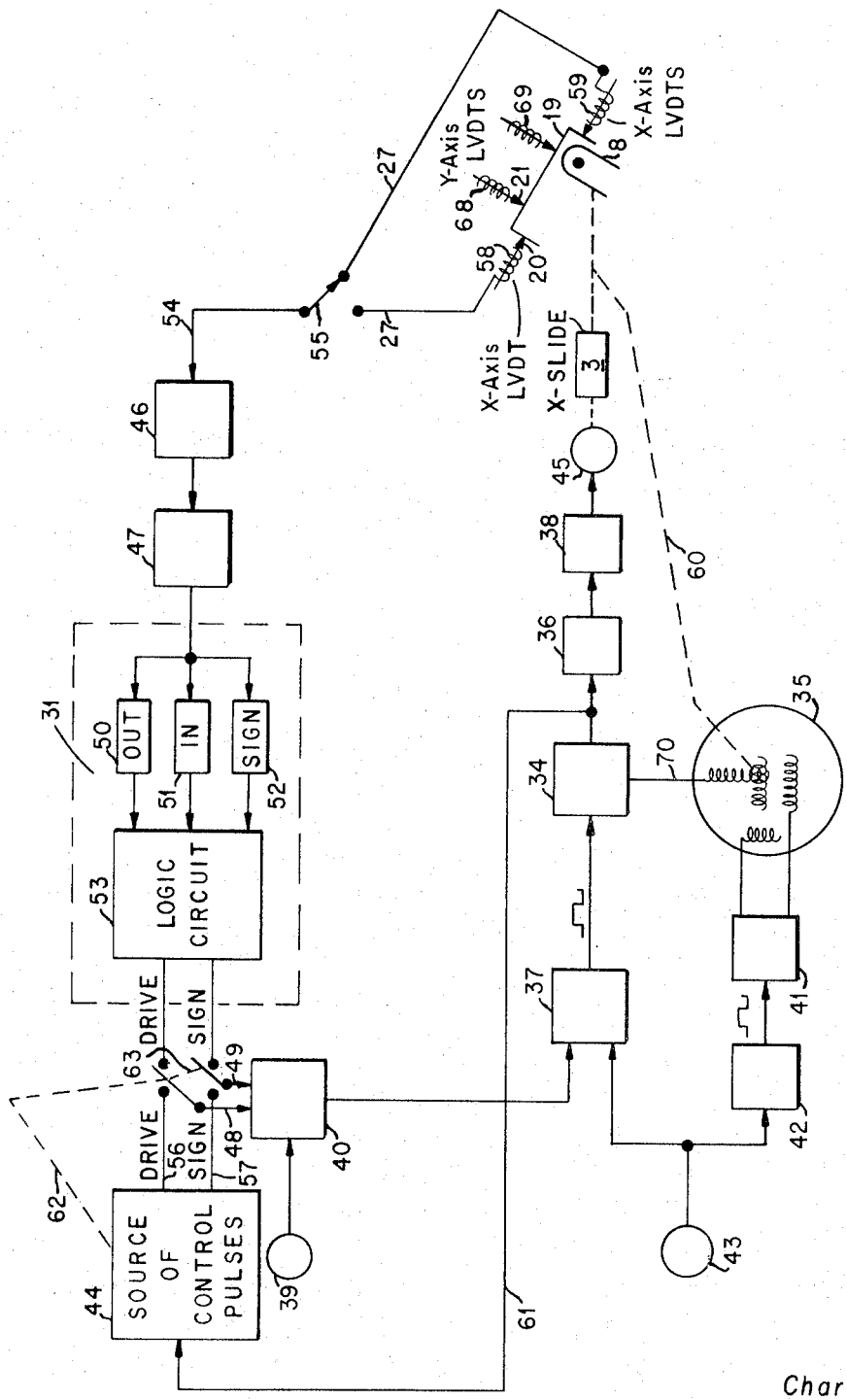
FIG. 2 is a schematic wiring diagram of a conventional tape-controlled circuit for one of the slides of the lathe plus the tool-positioning circuitry of the present invention.

The tool reference-positioning gauging means of the present invention for use with the above-described tape-controlled lathe will now be described. This gauging means comprises a gauge block 19 for supporting four Linear Variable Differential Transformer (LVDT) gauging units 58, 59, 68, and 69, as more clearly shown in FIG. 2, the details of one such unit being shown in FIG. 5. The contact button 20 of the LVDT 58 of FIGS. 2 and 5 is shown in FIG. 1 and the contact button 21 of the LVDT 68 of FIG. 2 is also shown in FIG. 1. The contact buttons for the LVDT's 59 and 69 of FIG. 2 are not shown in FIG. 1 since they are hidden from view. The output signals from the LVDT's are connected by means of leads 27 to a junction box 26 and these leads are in turn joined to and connected by suitable conductors to feed into the control box 25. Control box 25 contains suitable circuitry to effect movement of the X slide 3 and the Y slide 11 to position the cutting tool 8 to the preselected reference position in a manner to be described below.

After the cutting tool 8 reaches the reference position, a signal over lead 61 from the unit 25 will effect transfer, by means of a mechanical coupling 62, of the controls in unit 25 back to the tape-controlled unit 44 and the signals over leads 56 and 57 from unit 44 will effect a desired machining operation in a manner to be described below.

Referring now to FIG. 2, the standard Heald-Bendix machine control unit, mentioned above, includes a source of control pulses 44 for feeding a drive signal over lead 56 and a sign signal over lead 57 to a gate unit 40 such that the position of the X machine slide 3 is controlled by a servo error voltage which is generated by a phase detector 34 to control the cutting motions of the machine tool 8 in accordance with directions punched into a control tape in unit 44.

The servo voltage from the phase detector 34 is proportional to the cosine of the phase difference between two input voltages—an X-position command signal and an X-position feedback voltage. The feedback voltage is derived from a resolver 35 over a lead 70; the phase of this voltage varies with the position of the slide 3, which is mechanically coupled to resolver 35 by a coupling 60. As shown, the stator voltages for the resolver 35 are derived from a supply 41, whose input is supplied by a reference counter 42. The output of the counter 42 is a 200-c.p.s. square wave derived from a clock oscillator 43.

The other input to the phase detector 34, the X-position command signal, is a nominal 200-c.p.s. square wave derived from a command counter 37. The counter 37 generates the square wave from the output of the clock oscillator 43. As shown, the command counter 37 is connected to receive X-position command pulses from a control circuit which includes a pulse generator 39 and a pulse gate 40. Each command pulse gated to the command counter 37 shifts the phase of the X-position command signal by a given small amount relative to the output of the reference counter 42. The direction of the phase shift is determined by the "sign" (+ or −) of the command pulse. The phase difference between the outputs of the reference counter 42 and the command counter 37 comprises the "distance command" to the X slide 3, whereas the rate of change in the phase difference comprises the "velocity command." The gating of the command pulses to the counter 37 by way of lead 56 and the "sign" of these pulses by way of lead 57 are controlled by a programmed tape in unit 44. The tape is punched with binary-coded "drive" information for the X-axis slide, and a supplementary channel is punched with "sign" information for the same. It should be understood that a similar control circuit, not shown, is provided for simultaneously controlling the Y machine slide in accordance with directions punched into the above control tape in unit 44.

Thus, the output of the phase detector 34 is used to position the X slide 3 in FIG. 2 by means of a servo amplifier 36, a motor control unit 38, and a motor means 45 which may be an electrically controlled hydraulic motor, for example. The Y slide 11 of FIG. 1 is positioned by a similar control circuit as used for the X slide as described above such that the X and Y motions of the lathe can be controlled to perform a preselected machining operation on a part to be machined, in accordance with directions punched on the control tape in the unit 44, with such directions being correlated to the manually set position of the tool a given distance from a reference point on the prior machine (the center of the turret, for example), as discussed above.

The present invention was designed to assume control of the above X and Y motions of the machine on command and to supply the "drive" and "sign" signals required to automatically position the cutting edge of a worn or of an unused tool to a predetermined reference position by the use of position gauges in the following manner. In FIG. 2 the tool 8 is caused to contact a pair of LVDT's 59 and 69 or a pair of LVDT's 58 and 68, depending upon whether the machine is to be used for machining outside contours or inside contours of a contoured part. There is a predetermined reference point for each pair of LVDT's and the control tape is programmed to carry out a desired machining operation once the cutting tool is positioned in one of the reference positions. It should be understood that a different programmed tape is used for each of the tool reference positions. The X-axis LVDT 58 and the Y-axis LVDT 68 may be used for setting the cutting tool 8 to one reference position when inside contour machining of a part is to be done, or the X-axis LVDT 59 and the Y-axis LVDT 69 may be used for setting the cutting tool 8 to another reference position when outside contour machining of a part is to be done. The output of LVDT 58 or the output of LVDT 59, depending upon which is being utilized at the time, is connected by a respective lead 27 to a lead 54 by means of a selector switch 55. This output signal from either LVDT 58 or LVDT 59 is normally at a maximum and the tool 8 is caused to depress the contact plunger of the one of these LVDT's which is switched into circuit with lead 54 at the time to thus vary the output signal therefrom until it reaches zero, at which time the motion of tool 8 is stopped along the X axis, and when the motion of the Y slide is stopped along the Y axis by a similar control circuit, then the tool 8 is at the desired reference position.

The output signal from the selected LVDT is fed by the lead 54 to an amplifier 46 and then the amplified signal is fed to a demodulator 47. The output of unit 47 is fed to a unit 31 which includes three Schmitt trigger (ST) circuits 50, 51, 52 designated respectively as "Out," "In," and "Sign," and a logic circuit 53. The outputs of circuit 53 which provide a "drive" signal and a "sign" signal are connected by means of a selector switch 63 to leads 48 and 49, respectively, to the gate unit 40 such that the X slide 3 is caused to actuate the selected LVDT 58 or LVDT 59 until the output therefrom reaches zero. At this time, the output of phase detector 34 is zero and such a condition is utilized by means of a lead 61 connected to a suitable control device in the unit 44 to cause switch 63 to switch from the unit 53 to the unit 44 by means of a mechanical coupling 62. When the corresponding Y-axis LVDT output reaches zero, then the machine tool has been properly referenced and the desired machining operation can then be effected as programmed by the tape in unit 44, the tape being programmed with respect to such reference position.

An example of a typical operation (X axis only) of the positioning of the cutting tool 8 to a reference position by the gauging circuit of the present invention will now be described. Before each automatic tool-setting operation, the control tape (or the machine operator) commands the machine to move the cutting tool to a position where its cutting edge is close to, but not touching, the selected pair of LVDT's 58, 68 or 59, 69. The tape (or the machine operator) then transfers control of the machine to the gauging circuit of the present invention. When positioned at "machine zero," the tool 8 is not contacting either LVDT; thus, the output voltage of the X-axis LVDT is at a maximum. This voltage (typically about 1 volt, at 10 kc.) is fed through the standard amplifier 46 and demodulator 47 to generate a D.C. voltage of —5 volts. This D.C. voltage, which is proportional to the LVDT displacement from its centered (zero output) position, is applied to each of the three standard ST circuits 50, 51, and 52.

The three ST circuits 50, 51, and 52 have been percalibrated to be in the reset (zero output) state initially. As shown in FIG. 3, the output of the "In" ST 51 is connected directly to an "AND" gate 64. The outputs of the other ST's are respectively connected to gate 64 through inverters 65. Each inverter 65 output is —6 volts when its input is zero, and is zero when its input is —6 volts. Thus, at this time the "AND" gate 64 is not satisfied, two of its inputs being at —6 volts and one input, from the "In" ST 51, being at zero. It is assumed that a manual "direction-setting" switch 74 has been preset to the "In" position, as shown. The function of this switch will be explained below. The output from the "AND" gate 64, when unsatisfied, is —8 volts, and, when satisfied, is zero volts. As shown, the "drive" output terminal of the AND gate is connected to the X-axis drive lead 48. Thus, —8 volts is now being applied to the drive lead, producing movement of the X slide 3 of FIG. 2 at a preselected rate.

As shown in FIG. 3, the output terminal of the "Sign" ST 52 is also connected, through an inverter 66, to the above-mentioned "sign" lead 49. At this time, the output of the inverter 66 is —6 volts. The application of a negative voltage to lead 49 phase-shifts the gate 40 output of FIG. 2 in the direction required for inward movement of the X-axis slide.

The manner in which the AND gate 64 is satisfied, thus stopping movement of the X slide 3 and referencing the edge of the tool 8 on the X axis, is best explained by reference to FIG. 4. This figure illustrates the relationship of the demodulator 47 output voltage and the settings of the ST circuits 50, 51, and 52. As set forth above, the automatic tool-setting circuit has begun moving the tool inward along the X axis at a preselected rate, and the ST's 50, 51, and 52 remain in the reset state as the tool contacts the selected X-axis LVDT and moves it inward, progressively reducing the demodulator 47 output voltage from its initial maximum of —5 volts. The decreasing voltage crosses a boundary voltage setting 84 for the "Sign" ST 52, but a decreasing voltage does not affect the state of this ST. Thus, the "Sign" ST 52 remains reset. As the voltage decreases to a negative value near zero, it crosses a boundary setting 85 for the "In" ST 51, making it go set. The output of this ST 51 immediately goes to —6 volts, satisfying the AND gate 64 (FIG. 3) and de-energizing the drive lead 48. The X-axis movement stops, and the tool edge is now in the X-axis reference position. Standard switching now transfers control of the machine back to the control tape in unit 44 in the manner as set forth above.

It should be noted in FIG. 4 that the demodulator output is zero (i.e., the LVDT is in zero-output position) when the tool edge is in the desired reference position on the X axis. It is necessary that the boundary setting 85 be preselected to permit slight coasting of the slide after the drive signal has been removed. In a typical calibration, the "In" ST 51 goes set when the tool edge is 20 microinches from the reference position.

The machine operator presets the "direction-setting" switch 74 to "In" if the machine tool is to be used for cutting "in" with respect to a contoured part to be machined. This ensures that the automatic tool-setting operation terminates in an inward movement of the slide. Thus, cutting operations then can be started without encountering backlash in the mechanical drive system. When the direction of movement of the cutting tool is to be "out" with respect to the contoured part to be machined, then the switch 74 is positioned in the "Out" position during the automatic tool reference-positioning operation. In other words, the switch 74 is placed in the "In" position or in the "Out" position during automatic tool-setting operation, depending upon whether the cutting tool will be moving in one direction ("in") or the opposite direction ("out") during a machining operation, after the tool has been positioned in the reference position.

When the switch 74 is placed in the "Out" position, the inverter 65 associated with the "Sign" ST 52 output is no longer in circuit with the AND gate 64. The automatic tool-setting cycle then is as follows:

(1) All ST's (50, 51, 52) are in the reset state; the X slide is being driven inward.

(2) The inputs to the AND gate 64 are —6 volts (from the "Out" ST 50), zero (from the "In" ST 51), and zero (from the "Sign" ST 52).

(3) Boundary 84 is crossed; the "Sign" ST 52 remains reset.

(4) Boundary 85 is crossed, setting the "In" ST 51, which changes the input at AND gate 64 terminal 67A to —6 volts. Boundary 86 is then crossed, setting the "Out" ST 50 which changes the input to "AND" gate terminal 67 to zero.

(5) Boundary 87 for the "Sign" ST 52 is crossed, setting this ST and changing its output to —6 volts. This changes the output of the inverter 66 to zero, removing the negative voltage from the "sign" lead 49 and thus reversing the direction of slide 3 motion. The slide motion now is outward with respect to the LVDT.

(6) Boundary 87 is recrossed, but the "Sign" ST 52 is not reset by a decreasing voltage.

(7) A boundary 93 of the "Out" ST 50 is crossed by the now decreasing demodulator voltage. This resets the "Out" ST 50 and changes the input at AND gate terminal 67 to —6 volts. This satisfies the AND gate 64 (all inputs are now at —6 volts), removing the drive signal (—8 volts) from drive line 48. This de-energizes the drive system, and the slide coasts to a stop. The edge of the tool now has been brought to the reference position, the final direction of movement of the slide being outward with respect to the LVDT and with the part to be machined such as to eliminate backlash from the mechanical drive system during the subsequent cutting operation.

Typically, the boundary 93 is preset to de-energize the drive system when the tool edge is 20 microinches from the reference position. Thus, a typical automatic tool-setting operation as described above is accurate to ±20 microinches.

If the outwardly moving slide should coast past the reference point, a boundary 94 of the "In" ST 51 is crossed by the now increasing demodulator voltage. This causes the "In" ST 51 to reset, reapplying the drive signal to lead 48. When the increasing demodulator voltage crosses boundary 84 of the "Sign" ST 52, this ST is reset, restoring the −6 volt signal to lead 49 and thus reversing the direction of the drive. The cycle (steps 1–7 above) then is repeated in another attempt to position the tool edge in the reference position.

It should be noted that when the switch 74 is in its "In" position, as described above, and the X slide, after crossing the boundary 85, should coast past the boundary 86, then the drive lead 48 is re-energized and the boundary 87 will be crossed twice as above and the boundaries 93, 94, and 84 will be sequentially crossed by the X slide, and the boundaries 84 and 85 are then recrossed again before the drive lead 48 is de-energized in another attempt to position the tool edge in the reference position.

A typical automatic tool-setting cycle requires about one minute. The typical referencing operation is accomplished by positioning the X and Y slides simultaneously.

The Linear Variable Differential Transformer (LVDT) gauging units used in the automatic tool-reference-positioning operation of the present invention are made by the Sheffield Corporation of Dayton, Ohio, or by Pratt and Whitney Company of Hartford, Conn. A schematic showing of one such LVDT unit is shown in FIG. 5, wherein a contact plunger having a tool-engaging head or button 20 is movable with respect to coils 71, 72, and 73, such that the output lead 27 from the center coil 73 provides an output signal which is indicative of the position of the plunger. As set forth above, the output on lead 27 is at a maximum (−5 volts) when the head 20 is not contacted and the output is zero volts when the cutting tool positions the plunger to a position corresponding to a desired reference position for the tool.

It should be noted that the use of the automatic tool-setting system of the present invention, as described above, improves the accuracy of machining by a factor of two and reduces the time required (for tool setting and machining) by a factor of five, as compared with manual tool setting as with the machine of the prior art.

This invention has been described by way of illustration rather than by way of limitation and it should be apparent that the present invention is equally applicable in fields other than those described.

What is claimed is:

1. In a tape-controlled cutting machine including a cutting tool, slidable means for supporting said cutting tool, a slidable workpiece holder means for holding a part to be machined, means for effecting movement of said slidable means and the cutting tool affixed thereto in one direction or the opposite direction along a first axis, means for effecting movement of said slidable workpiece holder means in one direction or the opposite direction along a second axis perpendicular to said first axis, a source of control pulses comprising a programmed tape to provide a first drive signal and a first sign signal, and to provide a second drive signal and a second sign signal, means for coupling said first drive and first sign signals to said means for moving said cutting tool along said first axis, means for coupling said second drive and second sign signals to said means for moving said workpiece holder along said second axis, said signals provided by said programmed tape to said respective movement means effecting a predetermined machining operation on said part to be machined, the improvement comprising means for automatically positioning said cutting tool to a predetermined reference position prior to said machining operation, said tape being programmed with respect to such reference position to effect a desired machining operation after tool positioning, said tool positioning means comprising a pair of tool position gauging devices mounted on said machine at right angles to each other and in respective alignment with said axes, and said devices adapted to be engaged by said cutting tool, each of said gauging devices providing a maximum output signal therefrom prior to engagement therewith by said cutting tool and providing a variable output signal as a function of tool position after engagement by said cutting tool, means coupled to each of said output signals from said devices for providing respective third and fourth drive and third and fourth sign signals therefrom, switch means for selectively connecting said source of tape control pulses to said respective movement means during said machining operation, or connecting said third drive and third sign signals and said fourth drive and fourth sign signals to said respective movement means during said tool positioning, said signals provided by said means coupled to said gauge devices providing control to said respective tool movement means and workpiece holder movement means to effect movement of said tool and holder to cause said cutting tool to engage each of said respective gauging devices and vary the outputs therefrom until such outputs become zero at which time each of said movement means is inactivated and the cutting tool has reached said reference position, and means responsive to zero output signals from said gauging devices to cause said switch means to switch control of said movement means back to said source of control pulses whereby said desired machining operation on said part to be machined, as programmed by said tape, is effected.

2. The device set forth in claim 1, wherein each of said tool position gauging devices comprises a Linear Variable Differential Transformer.

3. The device set forth in claim 1, wherein each of said movement means comprises a control circuit including a phase detector, a resolver for providing a feedback voltage as a function of the position of one of said slidable means, a reference counter connected to said resolver, means for feeding said resolver feedback voltage as one input to said phase detector, gate means connected to receive selected ones of said drive and sign signals, a command counter connected between said gate means and phase detector, said command counter providing a second input to said phase detector, said selected drive and sign signals gating said gate means to provide a phase shift between the outputs of said command counter and reference counter, the direction of such phase shift being determined by said sign signals, said phase detector providing an output signal as a function of said selected drive and sign signals, amplifier means connected to the output of said phase detector, motor control means connected to the output of said amplifier means, and motor means connected to said motor control means, said motor means effecting movement of said one of said slidable means in accordance with said selected ones of said drive and sign signals.

4. The device set forth in claim 1, wherein said means coupled to the respective output of each of said gauging devices to provide said respective drive and sign signals includes an amplifier connected to one of said gauging devices, a demodulator connected to the output of said amplifier, three Schmitt trigger circuits having different boundary settings and connected to the output of said demodulator, said circuits being designated as "Out," "In," and "Sign," respectively, and AND gate, a first inverter connected between the "Out" trigger circuit and one input to said AND gate, said "In" trigger circuit being connected directly as a second input to said AND gate, a second inverter connected between said "Sign" trigger circuit and a third input to said AND gate, a third inverter connected to the output of said "Sign" trigger circuit, the output of said third inverter providing said sign signal, said AND gate being satisfied only when the output of said one gauging device becomes zero when said cutting tool reaches said reference position, the output of said AND gate when not satisfied providing said drive signal, and when satisfied terminating said drive signal, and a second switch means for selectively shunting out said second inverter such that said "Sign" trigger circuit is directly connected to the third input to said AND gate while at the same time effecting a reversal of said sign signal at the output of said third inverter, whereby said sign signal can be selectively controlled to control the final direction of movement of the associated slidable means to eliminate mechanical backlash in the subsquent machining operation.

5. The device set forth in claim 1, wherein a second pair of tool position gauging devices are mounted on said machine at right angles to each other and in respective alignment with said axes, said pairs of gauging devices being mounted in a common housing such that either pair of devices is adapted to be engaged by said cutting tool depending upon whether the cutting tool is to be positioned to one reference position prior to "inside" contour machining or to be positioned to a second reference position prior to "outside" contour machining, and means for selectively connecting one pair of said gauging devices or the other pair of said gauging devices to said means for providing said respective drive and sign signals to said respective movement means, depending upon whether inside or outside contour machining is desired subsequent to the tool positioning operation.

References Cited

UNITED STATES PATENTS 3,181,401   5/1965   Rice et al. _____ 82—34

LEONIDAS VLACHOS, *Primary Examiner.*